United States Patent
Mueller et al.

(10) Patent No.: US 10,641,353 B2
(45) Date of Patent: May 5, 2020

(54) DAMPING ASSEMBLIES FOR A VEHICLE PART TO REDUCE AN IMPACT

(71) Applicant: Ford Global Technologies LLC, Dearborn, MI (US)

(72) Inventors: Gerd Mueller, Nanjing (CN); Sheldon Liu, Nanjing (CN); Wei Xu, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 159 days.

(21) Appl. No.: 15/703,681

(22) Filed: Sep. 13, 2017

(65) Prior Publication Data

US 2018/0080517 A1  Mar. 22, 2018

(30) Foreign Application Priority Data

Sep. 19, 2016 (CN) .......................... 2016 1 0833232

(51) Int. Cl.

| | |
|---|---|
| *F16F 3/10* | (2006.01) |
| *B60K 5/00* | (2006.01) |
| *B60K 5/12* | (2006.01) |
| *B60K 15/03* | (2006.01) |
| *B62D 25/20* | (2006.01) |
| *F02M 37/00* | (2006.01) |
| *F02M 37/04* | (2006.01) |

(52) U.S. Cl.

CPC ................ *F16F 3/10* (2013.01); *B60K 5/00* (2013.01); *B60K 5/1208* (2013.01); *B60K 15/03* (2013.01); *B62D 25/2072* (2013.01); *F02M 37/0011* (2013.01); *B60K 2015/03407* (2013.01); *B60Y 2410/114* (2013.01); *F02M 37/04* (2013.01)

(58) Field of Classification Search
CPC .. F16F 3/10; B60K 15/03; B60K 5/00; B60K 5/1208; F02M 37/0011; B62D 25/2072
See application file for complete search history.

(56) References Cited

U.S. PATENT DOCUMENTS

| | | | |
|---|---|---|---|
| 3,659,965 A | 5/1972 | Ebert et al. | |
| 6,854,451 B2 | 2/2005 | Ebihara et al. | |
| 7,442,015 B2 | 10/2008 | Oi et al. | |
| 7,930,154 B2 | 4/2011 | Brusoe | |
| 9,151,257 B2 | 10/2015 | Jeon et al. | |
| 9,328,704 B2 | 5/2016 | Okazono et al. | |
| 2017/0101002 A1* | 4/2017 | Dudar | G01M 3/36 |
| 2018/0141432 A1* | 5/2018 | Demaria | B60K 15/03 |

FOREIGN PATENT DOCUMENTS

KR   20130104142   9/2013

* cited by examiner

*Primary Examiner* — Joseph D. Pape
(74) *Attorney, Agent, or Firm* — Geoffrey Brumbaugh Kolitch Romano LLP (57) ABSTRACT

A damping assembly in a vehicle is provided. The damping assembly comprises a rod; a spring disposed along a lengthwise direction of the rod; and a buffer pad including a connection end coupled to the rod and an external end opposing the connection end and including a buffer surface. The spring is coupled with the rod and configured to be retracted and extended with the rod at the lengthwise direction.

15 Claims, 6 Drawing Sheets

DAMPING ASSEMBLIES FOR A VEHICLE PART TO REDUCE AN IMPACT

RELATED APPLICATION

This application claims the benefit of Chinese Patent Application No.: CN 201610833232.4 filed on Sep. 19, 2016, the entire contents thereof being incorporated herein by reference.

FIELD

This present application relates a damping assembly for a vehicle part to reduce an impact, in particular, a damping assembly used in a fuel tank pump and a bottom protection panel under an engine to reduce an impact from outside environment.

BACKGROUND

Figure 1:
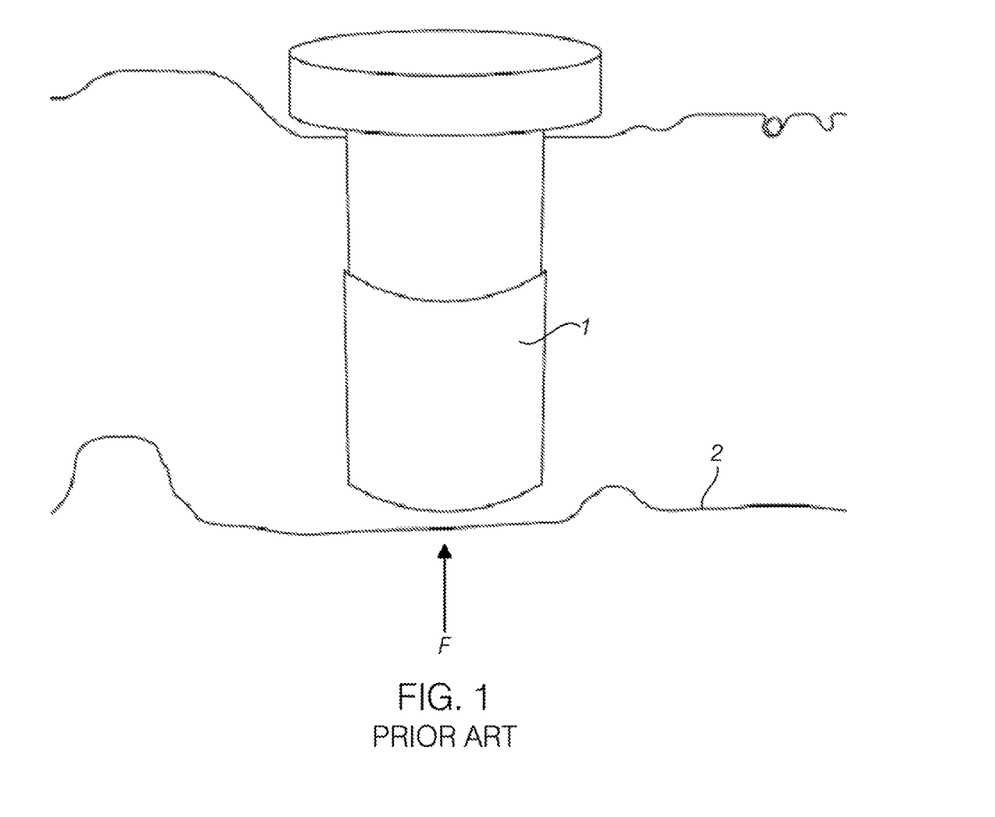
FIG. 1 shows a schematic diagram of vehicle fuel tank pump of prior art, illustrating the position of the fuel tank in a vehicle.

A vehicle may be driven on a bumpy road, or a road with a poor driving condition. Rocks on the road or a hard protrusion from a road may hit a frame of the vehicle's chassis. The vehicle usually includes many devices adjacent to the chassis which have no damping unit. In an example illustrated in FIG. 1, a fuel tank pump 1 in a vehicle is installed near a vehicle lower frame 2. When the vehicle lower frame 2 is subject to a force F (e.g., hit by a rock) and the hitting point is near the fuel tank, a housing of the fuel tank pump 1 may be damaged because of lack of damping unit.

SUMMARY

According to one embodiment, a damping assembly in a vehicle is provided. The damping assembly comprises a rod; a spring disposed along a lengthwise direction of the rod; and a buffer pad including a connection end coupled to the rod and an external end opposing the connection end and including a buffer surface. The spring is coupled with the rod and configured to be retracted and extended with the rod at the lengthwise direction.

In one embodiment, the damping assembly further comprises a damper disposed between the rod and the buffer pad. The connection end of the buffer pad is coupled to the rod via the damper.

In another embodiment, a projection of the rod on a plane of the buffer surface is within a region covered by the buffer pad and the buffer surface is to be disposed adjacent to or connected to a surface of a vehicle part that may be subject to an outside impact directly.

In another embodiment, the rod is an extendable rod. The extendable rod includes a first sleeve and a second sleeve, and the first sleeve is disposed inside the second sleeve and extendable and retractable relative to the first sleeve.

In another embodiment, the spring is disposed inside the first sleeve or the spring is disposed outside the second sleeve and enclosing the second sleeve.

In another embodiment, the spring is disposed inside the rod or the spring is disposed outside the rod and at least partially enclosing the rod.

In another embodiment, the rod includes a first end coupled with the buffer pad and a second end opposing the first end, wherein the second end is connected with a base, and wherein the spring is disposed outside the rod and one end of the spring is connected with the base and another end is connected with the buffer pad.

In another embodiment, the spring further includes a first spring and a second spring spaced apart each other.

In another embodiment, the buffer pad is made from plastic or rubber and the buffer surface is a ring-shaped surface or a continuous flat surface.

According to another aspect, a fuel tank pump in a vehicle is provided. The fuel tank pump comprises a housing having a top portion and a bottom portion opposing the top portion, and a damping assembly. The damping assembly includes a rod having a first end and a second end, a spring coupled with the rod and having a spring force along a lengthwise direction of the rod, and a buffer pad having a connection end coupled to the second end of the rod and an external end having a buffer surface facing the bottom portion. The first end of the rod is connected to the top portion of the housing and the buffer surface of the buffer pad faces the bottom portion. The spring is extendable and extractable with the rod. The bottom portion is disposed at a position that may be subject to an outside impact.

In one embodiment, the buffer surface of the buffer pad is substantially perpendicular to the lengthwise direction of the rod and fixed to the bottom portion, contacts the bottom portion or spaced apart from and adjacent to the bottom portion.

In another embodiment, the buffer pad is formed integrally with the housing, and the buffer surface is formed on the bottom portion.

In another embodiment, the damping assembly further includes a damper disposed between the rod and the buffer pad, and the connection end of the buffer pad is coupled to the rod via the damper.

In another embodiment, an area of a cross section of the rod is smaller than an area of the buffer surface.

In another embodiment, the rod is a telescopic rod, wherein the telescopic rod includes a first sleeve and a second sleeve, and the first sleeve is disposed inside the second sleeve and extendable relative to the first sleeve.

In another embodiment, the spring is biased at a normal state.

In another embodiment, the damping assembly includes two damping assemblies disposed inside the housing, and the damping assembly is disposed surrounding a longitudinal axis of the housing at an equal distance inside the housing.

According to another aspect, a bottom protection panel assembly under an engine of a vehicle is provided. The bottom protection panel comprises a bottom protection panel; and a damping assembly to connect the bottom protection panel to a chassis frame of the vehicle. The damping assembly includes a rod having a first end and a second end, a spring coupled with the rod and configured to be extendable and extractable with the rod, and a buffer pad having a connection end and an external end including a buffer surface. The first end of the rod is connected to the chassis frame, the second end of the rod is coupled to the buffer pad and a buffer surface is connected to the bottom protection panel.

In one embodiment, the damping assembly further includes a damper disposed between the rod and the buffer pad, and the damper is a pneumatic damper, a hydraulic damper, or a mechanic damper.

In another embodiment, a projection of the rod on a plane of the buffer surface is within a region covered by the buffer pad.

The damping assemblies of the present disclosure have various advantages. Since the damping assembly includes a rod and a spring moveable with the rod, an impact on a buffer pad coupled with the rod can be absorbed as the spring extends and retracts to avoid possible damage from the impact. Further, as the buffer pad with a larger area is disposed on an end of the rod, the contacting area is increased to absorb the impact, thus, dampening effect can be improved.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed damping assemblies in a vehicle will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various damping assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 2A:
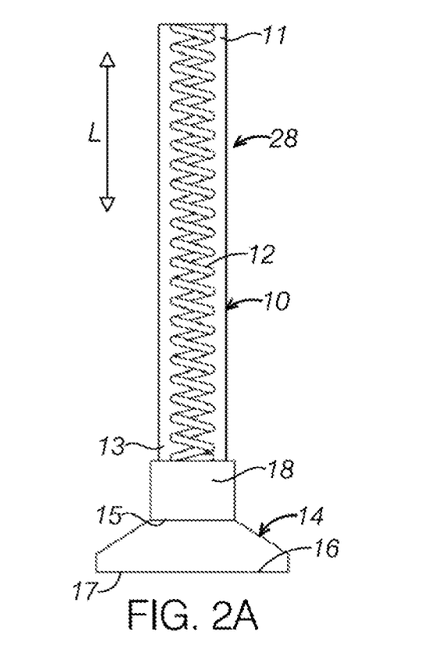
FIGS. 2A and 2B are schematic diagrams of a damping assembly according to one embodiment of the present disclosure.
Figure 2B:
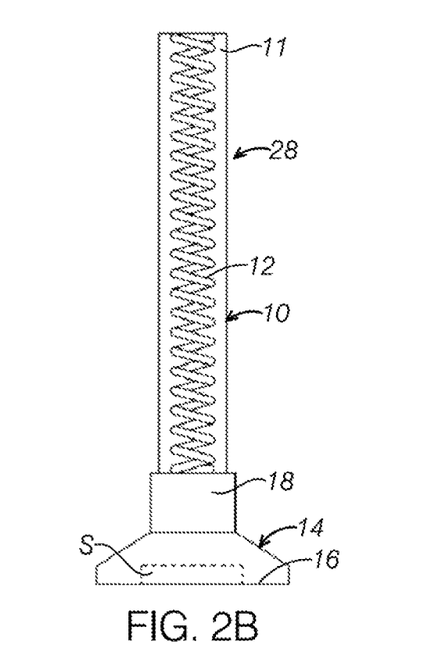

Referring to FIGS. 2A to 2B, a damping assembly 28 in a vehicle according to some embodiments of the present invention is illustrated. The damping assembly 28 may be used in a vehicle that need to reduce or minimize an impact from outside environment. In some embodiments, the damping assembly 28 may be disposed between a first portion and a second portion opposing the first portion in a vehicle part. For example, the damping assembly 28 may be disposed in a fuel tank pump between a top portion and a bottom portion of a housing. In another example, the damping assembly 28 may be used to connect a lower protection panel under the engine with a chassis frame. The damping assembly 28 includes a rod 10, a spring 12, and a buffer pad 14. The rod 12 include a first end 11 and a second end 13. The first end 11 may be connected to a first portion of a vehicle part (not shown). The rod 10 may be an elastic rod or may be a telescopic rod. The spring 12 is linked or coupled to the rod 10 and to be extracted and extended with the rod 10 simultaneously. The buffer pad 14 includes a connection end 15 coupled to the rod 10 and an external end 17 opposing the connection end 15 and including a buffer surface 16. The external end 17 may be connected to a second portion of a vehicle part or disposed in a proximity to the second portion of the vehicle part (not shown). The buffer surface faces the second portion of the vehicle part that may be subject to an impact or an external force directly.

Continuing with FIGS. 2A and 2B, the spring 12 may be disposed along a lengthwise direction L of the rod 10 such that the spring force is in the lengthwise direction of the rod 10. When the damping assembly 28 is not subject to an impact, the spring 12 is at a non-extended state. In other words, the spring 12 is at a normal state, which is neither retracted nor extended. In some embodiments, the spring 12 may be configured to be biased, that is, slighted retracted. As such, the spring 12 has an elastic potential at the normal state, which facilitates the damping assembly 28 to dissipate energy when subject to the impact. In some embodiments, the rod 10 may be made from elastic material like rubber or plastic having elasticity such that it can extend or extract to a certain range. The damping assembly with the elastic rod has a simple structure.

As shown in FIGS. 2A and 2B, the damping assembly 28 includes the rod 10 and the spring 12 linked with the rod 10 which is extendable and retractable with the rod 10. When the buffer pad 14 connected with the rod 10 is subject to a force or an impact, the spring 12 and the rod 10 extends or retracts simultaneously to absorb the energy from the impact to avoid damage to the vehicle part connected with the damping assembly. In addition, due to the buffer pad 14 disposed on an end of the rod 10, the area subject to the force is increased, which further prevents the vehicle parts from the damage.

The damping assembly 28 may further include a damper 18 disposed between the rod 10 and the buffer pad 14. The connection end 15 of the buffer pad 14 is coupled to the rod 10 via the damper 18 or the connection end 15 is connected to the damper 18. In this way, damping effect of the damping assembly 28 can be further enhanced. The damper 18 may be an appropriate damper to dissipate the kinetic energy. For example, the damper 18 may an air damper, a hydraulic pressured damper, or a spring damper. The damper 18 may be fixed with the rod 10 and the buffer pad 14 via any appropriate connection mechanisms such as welding, or a detachably connected via any appropriate mechanisms such as screw/nut connection. In one embodiment, an outer wall of the damper 18 is also formed as a portion of the rod 10. In other words, the damper 18 may be integrated in the rod 10. In one embodiment, the damper 10 may be a pneumatic damper. One of the rod 10 or the buffer pad 14 may be connected with a piston of the pneumatic damper, and another one is connected with a cylinder of the pneumatic damper, to perform a pneumatic dampening.

Continuing with FIGS. 2A to 2B, a projection of the rod 10 on a plane of the buffer surface 16 is within a region covered by the buffer pad 14. In other words, an area of the buffer surface 16 is greater than an area of the cross-section of the rod 10 in a plane parallel the buffer surface 16. Therefore, the buffer surface 16 of the buffer pad 14 has a greater contacting area to obtain a better damping result. In some embodiments, the buffer pad 14 may be made from rubber or plastic. In one embodiment, the buffer surface 16 may be configured to have a ring shape. That is, the buffer pad includes a notch recessed from the buffer surface in a middle portion or have a ring-shaped surface. For example, the buffer pad may have a shape of a suction dish to form a suction space S as shown in FIG. 2B to absorb kinetic energy when an impact occurs. In another embodiment, the buffer surface 16 may also be a continued flat surface. Thus, the buffer surface 16 fully contacts the impacted portion for a further dampening.

Further, in one embodiment, in a direction away from the rod 10, the cross-section area of the buffer pad 14 along a plane perpendicular to the rod 10 is gradually increased. The buffer pad 14 is configured to have a cross-section area gradually increased from the connection end 15 to the buffer pad 16. For example, in one embodiment, the buffer pad 14 is a rubber part having a frustum shape. In other embodiments, the buffer pad is configured to have a shape of a suction cup.

Figure 3:
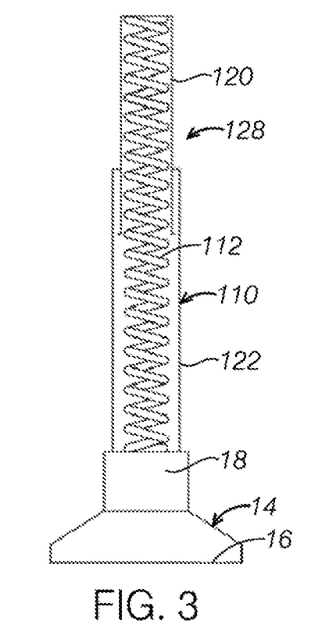
FIG. 3 is schematic diagram of a damping assembly according to another embodiment of the present disclosure.

FIG. 3 shows a damping assembly 128 according to another embodiment of the present disclosure. Hereinafter, the descriptions to the same elements as in the embodiments illustrated in FIG. 2A-2B will be omitted or mentioned briefly for the sake of brevity. In other words, differences between the present embodiment and the embodiment of FIG. 2A-2B will be mainly described. In the depicted embodiment, the rod 100 may be a telescopic rod which is comprised of a first hollow cylinder or a first sleeve 120 and a second hollow cylinder or a second sleeve 122. The first sleeve 120 is disposed inside the second sleeve 22 and extendable or retractable relative to the second sleeve 122. When the buffer pad 14 is subject to an impact, the first sleeve 120 slides into the second sleeve 122 and is received in the second sleeve 122. That is, the second sleeve 122 is pushed upward to make the first sleeve 120 gradually slid in the second sleeve 122.

It should be understood that the spring 12 may be disposed at appropriate positions that can couple with the rod 100 and move with the rod 100. In the embodiment depicted in FIG. 3, the spring is disposed inside the first sleeve 120.

Figure 5:
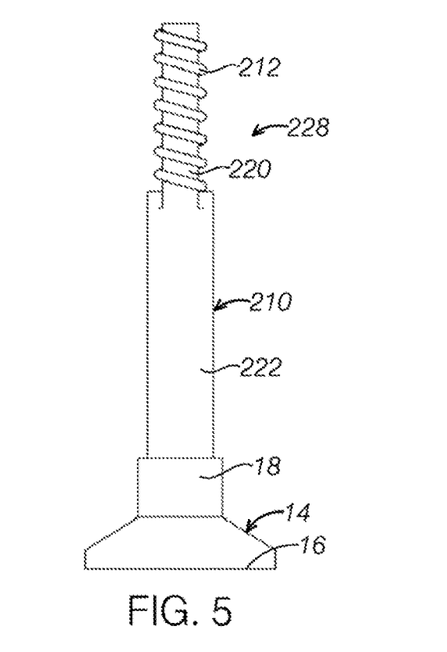
FIG. 5 is schematic diagram of a damping assembly according to another embodiment of the present disclosure.

Referring to FIG. 5, a damping assembly 228 according to another embodiment of the present disclosure is illustrated. In the depicted embodiment, the rod 210 is a telescopic rod and includes a first sleeve 220 and a second sleeve 222. The spring 212 is sleeved on an exterior of the first sleeve 220. When the damping assembly is subject to a force and the first sleeve 220 is slid into the second sleeve 222, at least a portion of the spring is located between the first sleeve 220 and the second sleeve 222.

Figure 6:
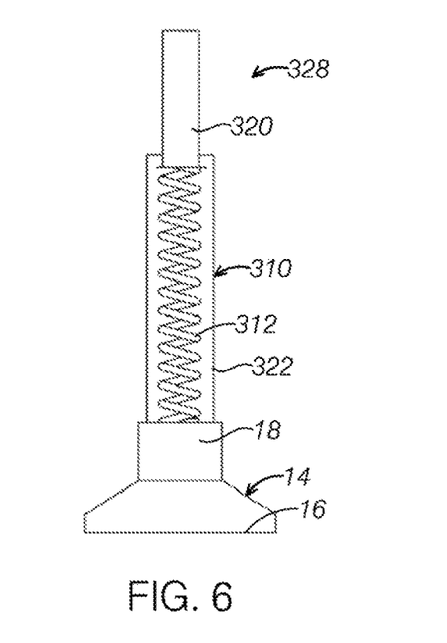
FIG. 6 is schematic diagram of a damping assembly according to another embodiment of the present disclosure.

Referring to FIG. 6, a damping assembly 328 according to another embodiment of the present disclosure is illustrated. In the depicted embodiment, the rod 310 is a telescopic rod and includes a first sleeve 320 and a second sleeve 322. The spring 312 is disposed inside of the second sleeve 322. In the depicted embodiment, a lower end of the first sleeve 320 is disposed on the spring 312.

Figure 7:
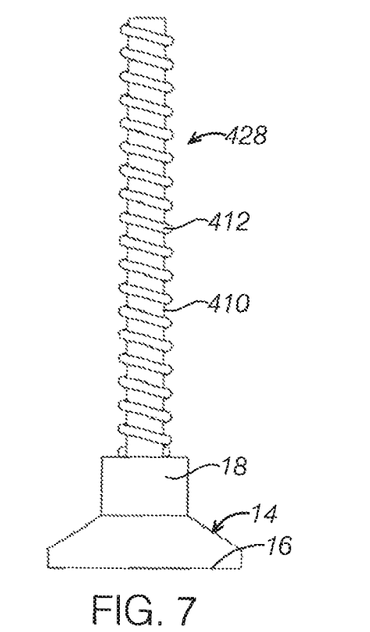
FIG. 7 is schematic diagram of a damping assembly according to another embodiment of the present disclosure.

Referring to FIG. 7, a damping assembly 428 according to another embodiment of the present disclosure is illustrated. The spring 412 may be disposed outside of the rod 10. That is, the rod 412 may be received in the spring at the lengthwise direction.

Figure 4:
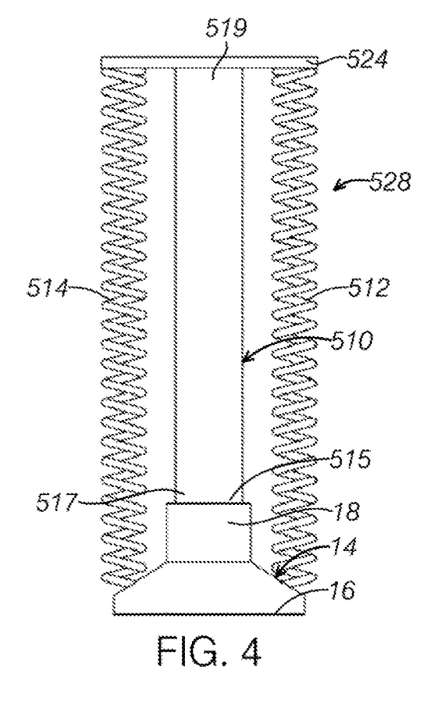
FIG. 4 is schematic diagram of a damping assembly according to another embodiment of the present disclosure.

Referring to FIG. 4, a damping assembly 528 according to another embodiment of the present disclosure is illustrated. A spring 512 may be disposed along a lengthwise direction, outside a rod 510 and spaced apart from the rod 512. The rod 510 includes a first end 517 coupled with the buffer pad 14 and a second end 519 opposing the first end, and the second end 519 is connected with a base 524. The spring 512 is disposed outside the rod 510 and one end of the spring is connected with the base 24 and another end is connected with the buffer pad 14.

Continuing with FIG. 4, the damping assembly 528 may include a plurality of spring disposed along a lengthwise direction L. In the depicted embodiment, the damping assembly 528 includes a first spring 512 and a second spring 514 spaced apart each other. In another embodiment, three springs may be disposed at an outside of the rod 510 in an equal interval along a circumference of a circle.

It should be understood that the embodiments in FIGS. 2 to 7 may be combined in any forms that are not illustrated in the figures. Therefore, the embodiments as shown in FIGS. 2 to 7 do not limit the invention.

Figure 8:
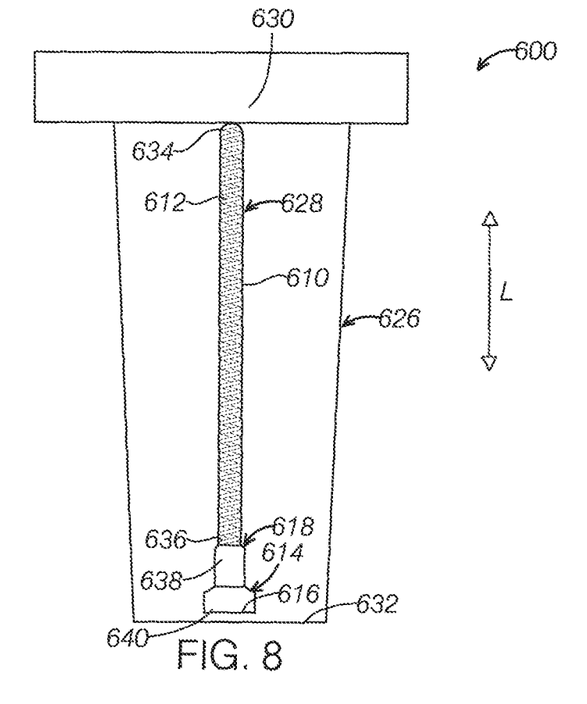
FIG. 8 is a schematic diagram of a damping assembly and a fuel tank pump according to one embodiment of the present disclosure.

FIG. 8 illustrates a fuel tank pump 600 in a vehicle according to one embodiment of the present disclosure. The fuel tank pump 600 comprises a housing 626 and a damping assembly 628. The fuel tank pump 600 includes a top portion 630 and a bottom portion 632 opposing the top portion 630. The bottom portion 632 may be exposed to an external environment and may be subject to an impact directly. For example, the bottom portion 632 may be connected on a bottom of a chassis of the vehicle and may be directly subject to an outside force such as a hit by a rock. The damping assembly 628 is disposed in the housing 626 and includes a rod 610 and a spring 612. The rod 610 may be a elastic rod or a telescopic rod. The spring 612 is disposed along a lengthwise direction L of the fuel tank pump 600 and moveable with the rod 610. The spring 612 is shown to be inside the rod 610. It should be appreciated that the spring 612 and the rod 610 may have the configurations as illustrated in FIGS. 2A to 7 or any variations. A spring force is substantially in a direction of the lengthwise direction L such that the spring 612 is extendable and extractable with the rod 610. The rod 610 has a first end 634 connected to the top portion 630 and a second end 636. The damping assembly 628 further includes a buffer pad 614. The buffer pad 614 includes a connection end 638 coupled to the second end 636 of the rod 610 and an external end 640 including a buffer surface 616.

In the depicted embodiment, the damping assembly 628 includes the rod 610 and the spring 612 coupled with the rod 610 and moveable with the rod 610. When the buffer pad 616 connecting with the rod 628 is subject to an impact, the spring 612 and the rod 610 retract or extend to absorb the energy from the impact, thus preventing damage on the housing 626 of the fuel tank pump 600 and internal structures. Moreover, because the end of the rod 610 includes a buffer pad 614, the impact area is increased to further prevent the housing 26 of the fuel tank pump 600 and other internal structures from damage.

Figure 9:
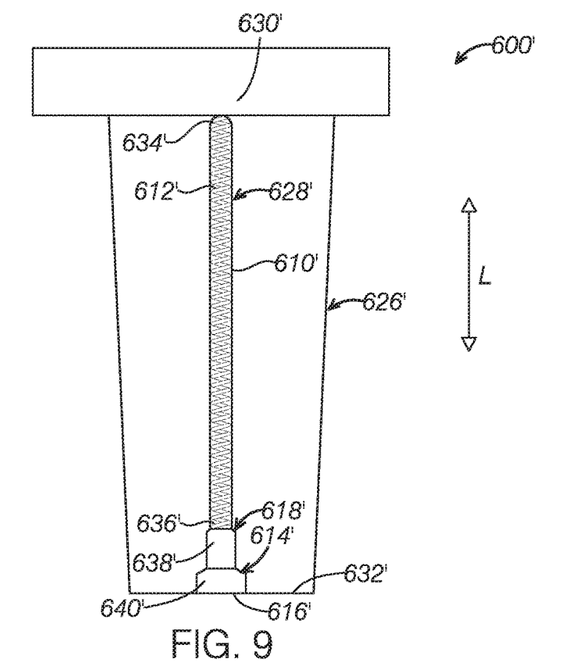
FIG. 9 is a schematic diagram of a damping assembly and a fuel tank pump according to another embodiment of the present disclosure.

In one embodiment, the buffer surface 616 of the buffer pad 614 may be fixed to the bottom portion 632. In another embodiment, the buffer pad 614 may contact the bottom portion 632. When the buffer surface 616 is fixed or contacts to the bottom portion 632, the buffering effect can be more effective. In yet another embodiment, the buffer pad 614 may be is spaced apart from and adjacent to the bottom portion 632. The space between the buffer pad 614 and the bottom portion 632 forms a predetermined buffering space. Yet, in some embodiments as illustrated in FIG. 9, the buffer surface 616' may be formed as a part of the bottom portion 632' to further prevent damage of the housing 626' from an impact. In other words, the buffer pad 614' may be formed integrally with the housing 626' and the buffer surface 616' is formed on the bottom portion 632' of the housing 626'.

In some embodiments, the damping assembly 628 further includes a damper 618 disposed between the rod 610 and the buffer pad 614. The connection end 638 of the buffer pad 614 is coupled to the rod 610 via the damper 618. In this way, dampening efficiency of the damping assembly 628 is further enhanced. It should be understood that the damper 618 may be a pneumatic damper, a hydraulic damper, or a spring damper. In addition, the damper 618 may be connected to the rod 610 and the buffer pad 614 via a fixed connection such as welding, or a detachable connection such as a screw/bolt. In another embodiment, an outer wall of the damper 618 may be formed as a portion of the rod 610. In other words, the damper 618 may be integrated in the rod 610.

In one embodiment, a projection of the rod 610 on a plane of the buffer surface 616 is within a region covered by the buffer pad 614. In this way, the buffer surface 616 of the buffer pad 614 has a greater contact surface to obtain an improved dampening result.

In one embodiment, the rod 610 may be a telescopic rod. In the depicted embodiment, the spring 612 is disposed inside the rod 610. In another embodiment, the spring 612 may be disposed outside the rod 610 and at least partially enclosing the rod 610.

Figure 10:
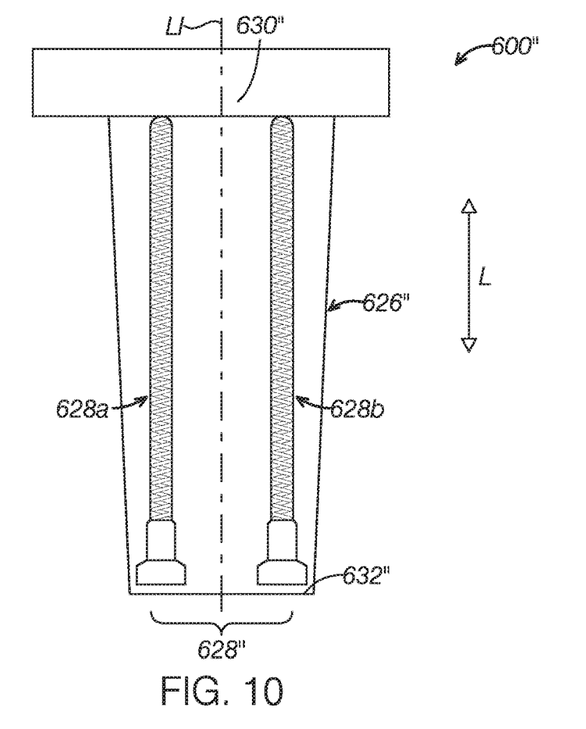
FIG. 10 is a schematic diagram of a damping assembly and a fuel tank pump according to yet another embodiment of the present disclosure.

In one embodiment as shown in FIG. 10, the damping assembly 628" includes a first damping assembly 628a and a second damping assembly 628b, which are disposed surrounding a longitudinal axis L1 of the housing at an equal distance inside the housing to ensure that all of the first damping assembly 628a and the second damping assembly 628b absorb energy evenly from the impact to avoid uneven absorption of the energy. Alternatively, the damping assembly 628 may be disposed on a center position of the housing along the longitudinal axis to adsorb the energy evenly.

It should be understood that the plurality of damping assembles 628 may be disposed surrounding a longitudinal axis of the housing at an equal interval outside the housing 626. Further in some embodiments, each of the plurality of buffer pad 614 of the damping assemblies 628 may have a single buffer pad, or the plurality of the buffer pads may share a single buffer pad.

It should be understood that the damping assembly of the invention can be implemented to any vehicle structures in addition to the fuel tank pump. For example, according to one aspect of the present disclosure, the invention also provides a bottom protection panel assembly under an engine of a vehicle. Take the embodiment in FIGS. 2A-2B as an example damping assembly, the bottom protection panel assembly is described. The bottom protection panel assembly comprises a bottom protection panel; and a damping assembly 28 connecting the bottom protection panel to a frame of the vehicle chassis. The damping assembly 28 includes a rod 10, a spring 12 coupled with the rod 10 to be extendable and retractable with the rod 10 and a buffer pad. One end of the rod 10 is connected to the frame of the chassis. The buffer pad 14 includes a connection end coupled to another end of the rod 10 and an external end including a buffer surface 16 connected with the bottom protection panel.

In the bottom protection panel assembly, the spring 12 is coupled with the rod 10 and movable with the rod 10. When the buffer pad 14 connected with the rod is hit by an object, the spring 12 and the rod 10 retract and/or extend simultaneously to absorb the energy generated from the impact to prevent the bottom protection panel under the engine and the internal structure from damage. In addition, since one end of the rod 10 includes the buffer pad 14, an impact area is increased to further prevent the bottom protection panel under the engine and the internal structures from damage.

In one embodiment, the damping assembly 28 further includes a damper 18 disposed between the rod 10 and the buffer pad 14. The connection end of the buffer pad 14 is coupled to the rod 10 via the damper.

Ass described above, a projection of the rod 10 on a plane of the buffer surface 16 is within a region covered by the buffer pad 14.

The damping assembly of the present disclosure can apply to a fuel tank pump and a bottom protection panel for an engine. The damply assembly may apply to other parts of the vehicle. For example, the damping assembly may be used in a hood of an engine compartment, a trunk lid, a protection shroud of an engine assembly, or any appropriate position on a vehicle frame. That is, the damping assembly may be used in any parts of the vehicle which needs dampening the impact from an external environment.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A fuel tank pump in a vehicle, comprising:
a housing, wherein the housing includes a top portion and a bottom portion opposing the top portion; and
a damping assembly, including:
a rod having a first end and a second end,
a spring coupled with the rod and having a spring force along a lengthwise direction of the rod, wherein the spring is extendable and extractable with the rod, and
a buffer pad, wherein the buffer pad includes a connection end coupled to the second end of the rod and an external end having a buffer surface facing the bottom portion,
wherein the first end of the rod is connected to the top portion and the buffer surface of the buffer pad faces the bottom portion, and wherein the bottom portion is disposed at a position that may be subject to an outside impact.

2. The fuel tank pump of the claim 1, wherein the buffer surface of the buffer pad is substantially perpendicular to the lengthwise direction of the rod and fixed to the bottom portion, contacts the bottom portion or spaced apart from and adjacent to the bottom portion.

3. The fuel tank pump of claim 1, wherein the buffer pad is formed integrally with the housing, and the buffer surface is formed on the bottom portion.

4. The fuel tank pump of claim 1, wherein the damping assembly further includes a damper disposed between the rod and the buffer pad, and wherein the connection end of the buffer pad is coupled to the rod via the damper.

5. The fuel tank pump of claim 1, wherein an area of a cross section of the rod is smaller than an area of the buffer surface.

6. The fuel tank pump of claim 1, wherein the rod is a telescopic rod, wherein the telescopic rod includes a first sleeve and a second sleeve, and wherein the first sleeve is disposed inside the second sleeve and extendable relative to the first sleeve.

7. The fuel tank pump of claim 1, wherein the spring is biased at a normal state.

8. The fuel tank pump of claim 1, wherein the damping assembly includes a first damping assembly and a second damping assembly disposed inside the housing, and wherein the first damping assembly and the second damping assembly are disposed surrounding a longitudinal axis of the housing at an equal distance inside the housing.

9. The fuel tank pump of claim 1, wherein the spring is disposed inside the rod.

10. The fuel tank pump of claim 1, wherein the spring is disposed outside the rod and at least partially enclosing the rod.

11. The fuel tank pump of claim 1, wherein the rod is telescopic and includes a first sleeve and a second sleeve, and the second sleeve is connected to the buffer pad, wherein the spring is sleeved on an exterior of the first sleeve and wherein, when the damping assembly is subject to a force and the first sleeve is slid into the second sleeve, at least portion of the spring is located between the first sleeve and the second sleeve.

12. The fuel tank pump of claim 1, wherein the rod is telescopic and includes a first sleeve and a second sleeve, and the second sleeve is connected to the buffer pad, and wherein the spring is disposed inside the second sleeve.

13. The fuel tank pump of claim 1, wherein the spring further includes a first spring and a second spring spaced apart each other.

14. The fuel tank pump of claim 1, wherein the buffer pad is made from plastic or rubber.

15. The fuel tank pump of claim 1, wherein the buffer surface is a ring-shaped surface or a continuous flat surface.

* * * * *